United States Patent
Johannessen

(10) Patent No.: US 8,088,201 B2
(45) Date of Patent: Jan. 3, 2012

(54) METHOD AND DEVICE FOR SAFE STORAGE AND USE OF VOLATILE AMMONIA STORAGE MATERIALS

(75) Inventor: Tue Johannessen, Glostrup (DK)

(73) Assignee: Amminex A/S (DK)

( * ) Notice: Subject to any disclaimer, the term of this patent is extended or adjusted under 35 U.S.C. 154(b) by 78 days.

(21) Appl. No.: 12/514,611

(22) PCT Filed: Dec. 21, 2007

(86) PCT No.: PCT/EP2007/011379
§ 371 (c)(1),
(2), (4) Date: Sep. 16, 2009

(87) PCT Pub. No.: WO2008/077626
PCT Pub. Date: Jul. 3, 2008

(65) Prior Publication Data
US 2010/0047638 A1  Feb. 25, 2010

(30) Foreign Application Priority Data

Dec. 22, 2006 (DE) .......................... 10 2006 061 370
May 16, 2007 (EP) .................................... 07009810

(51) Int. Cl.
*B01D 53/02* (2006.01)
(52) U.S. Cl. .... 96/108; 423/212; 423/213.2; 423/239.1; 60/274; 60/295
(58) Field of Classification Search .................. 96/108, 96/143; 95/128; 60/274; 423/212, 213.2, 423/239.1; 422/177
See application file for complete search history.

(56) References Cited

U.S. PATENT DOCUMENTS

| | | | |
|---|---|---|---|
| 5,161,389 A | 11/1992 | Rockenfeller et al. | |
| 6,301,879 B1 | 10/2001 | Weisweiler et al. | |
| 6,387,336 B2* | 5/2002 | Marko et al. | 423/212 |
| 2008/0066453 A1* | 3/2008 | Oberski et al. | 60/286 |

FOREIGN PATENT DOCUMENTS

| | | |
|---|---|---|
| DE | 199 25 671 | 12/1999 |
| WO | WO 99/01205 | 1/1999 |
| WO | WO 2004/042207 | 5/2004 |
| WO | WO 2004/071646 | 8/2004 |
| WO | WO 2005/091418 | 9/2005 |

(Continued)

OTHER PUBLICATIONS

International Preliminary Report of Patentability dated Jun. 24, 2009 for Application No. PCT/EP2007/011379.

(Continued)

*Primary Examiner* — Robert A Hopkins
(74) *Attorney, Agent, or Firm* — Frost Brown Todd LLC

(57) ABSTRACT

There is described a method and apparatus (100, 100') for storing and delivering ammonia wherein at least two ammonia storage materials (1a, 2a) capable of reversibly adsorbing or absorbing ammonia having different ammonia vapor pressures are used. Ammonia storage material (2a) having a lower vapor pressure, which is only partially saturated with ammonia or void of ammonia, is brought into fluid communication with ammonia storage material (1a) having a higher ammonia vapor pressure to adsorb or absorb ammonia released from the ammonia storage material (1a) having a higher ammonia vapor pressure when the latter is higher than a pressure threshold. An automotive $NO_x$ treatment system (200) comprising such apparatus (100, 100') is also described.

8 Claims, 7 Drawing Sheets

FOREIGN PATENT DOCUMENTS

| WO | WO 2006/012903 | 2/2006 |
|----|----------------|--------|
| WO | WO 2006/081824 | 8/2006 |
| WO | WO2006/081824  | 8/2006 |

OTHER PUBLICATIONS

Written Opinion Jun. 24, 2009 for Application No. PCT/EP2007/011379.
U.S. Appl. No. 11/815,146, filed Sep. 27, 2007, Johannessen et al.
U.S. Appl. No. 12/279,233, filed Aug. 13, 2008, Johannessen.
U.S. Appl. No. 12/374,448, filed Jan. 20, 2009, Johannessen.
U.S. Appl. No. 61/103,300, filed Oct. 7, 2008, Johansen et al.
U.S. Appl. No. 61/103,304, filed Oct. 7, 2008, Svagin et al.
U.S. Appl. No. 61,103,309, filed Oct. 7, 2008, Quaade et al.
U.S. Appl. No. 61/161,842, filed Mar. 20, 2009, Johannessen et al.
U.S. Appl. No. 61/169,776, filed Apr. 16, 2009, Johansen et al.
Elvers, B., "Ullmann's Encyclopedia of Industrial Chemistry: Urea," VCH Verlagsgesellschaft (1996) pp. 333-337.
International Search Report dated Jun. 30, 2008 for Application No. PCT/EP2007/011379.
Abstract for WO 99/001205, Jan. 1999.
Abstract for DE 199 25 671, Dec. 1999.

* cited by examiner

METHOD AND DEVICE FOR SAFE STORAGE AND USE OF VOLATILE AMMONIA STORAGE MATERIALS

FIELD OF THE INVENTION

This invention relates to ammonia storage and in particular to a method and apparatus for safe ammonia storage and release from a storage material capable of binding and releasing ammonia reversibly.

BACKGROUND OF THE INVENTION

Ammonia adsorbing and absorbing materials can be used as solid storage media for ammonia, which in turn, for example, may be used as the reductant in selective catalytic reduction (SCR) to reduce $NO_x$ emissions of automotive vehicles, see e.g. WO 99/01205. Usually, ammonia is released from those materials by thermal desorption by means of external (see e.g. WO 99/01205) or internal (see e.g. WO 2006/012903) heating of the container containing them. In many applications this way of storing and delivering ammonia has certain advantages compared to liquid ammonia or aqueous solutions of ammonia or urea.

Metal ammine salts, which are ammonia reversibly absorbing and desorbing materials can be used as solid storage media for ammonia. WO 99/01205 uses preferably granulated $Ca(NH_3)_8Cl_2$ or $Sr(NH_3)_8Cl_2$ as an ammonia storage material. In WO 2006/081824 metal ammine salt forms with a high volumetric ammonia storage capacity are described.

Usually ammonia is released from the solid storage media by thermal desorption. Also, solid storage media may be exposed to high temperatures by environmental conditions. Particularly in closed systems high ammonia vapor pressures may result.

SUMMARY OF THE INVENTION

In a first aspect the invention relates to a method for storing and delivering ammonia, wherein a first ammonia storage material capable of reversibly ad- or absorbing and desorbing ammonia having a first ammonia vapor pressure is brought into fluid communication with a second ammonia storage material capable of reversibly ad- or absorbing and desorbing ammonia having a second ammonia vapour pressure lower than said first ammonia vapour pressure which is only partially saturated with or completely void of ammonia, when the first ammonia vapour pressure is at or higher than a pressure threshold.

According to another aspect of the invention an apparatus for storing and delivering ammonia is provided which comprises first and second storing/delivery units connectable in fluid communication and containing first and second ammonia storage materials capable of reversibly ad- or absorbing and desorbing ammonia, wherein the first ammonia storage material in the first storing/delivery unit has a higher vapour pressure than a second ammonia storage material in the second storing/delivery unit.

A third aspect is an automotive $NO_x$ treatment system comprising such apparatus.

Other features are inherent in the methods and products disclosed or will be apparent to the person skilled in the art from the following detailed description of embodiments and its accompanying drawings.

BRIEF DESCRIPTION OF THE DRAWINGS

Embodiments of the invention will now be described by way of example and with reference to the drawings, in which.

DESCRIPTION OF EMBODIMENTS

The embodiments pertain to methods and apparatuses 100, 100', 100" using at least two storage materials 1a, 2a capable of binding and releasing ammonia reversibly by ad- or absorption and desorption and having different ammonia pressures and capable to actively lower the ammonia vapor pressure in the apparatus 100, 100', 100" or system by using the material 2a having the lower ammonia vapor pressure to absorb ammonia from the system when the pressure therein exceeds a threshold level by bringing the two materials 1a, 2a into fluid communication when the pressure increases beyond a threshold level.

Figure 1:
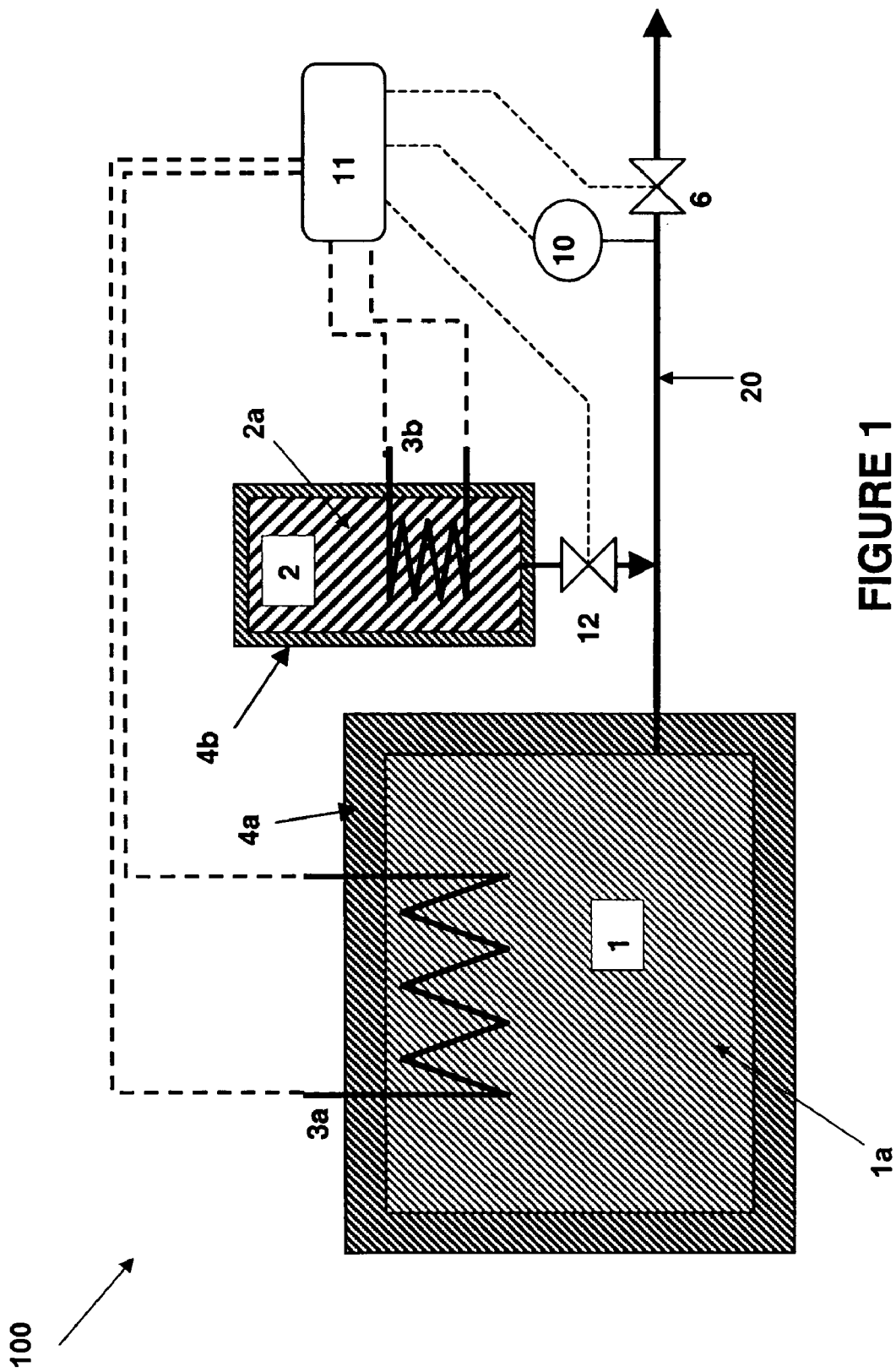
FIG. 1 shows an embodiment of an ammonia storage and delivery apparatus comprising a first storage/delivery unit (main storage tank) containing an ammonia storage material having a higher ammonia vapor pressure and a second storage delivery unit (storage chamber) smaller than the main storage tank and containing an ammonia storage material having a lower ammonia vapor pressure and which is only partially saturated with or void of ammonia in fluid communication.
Figure 2:
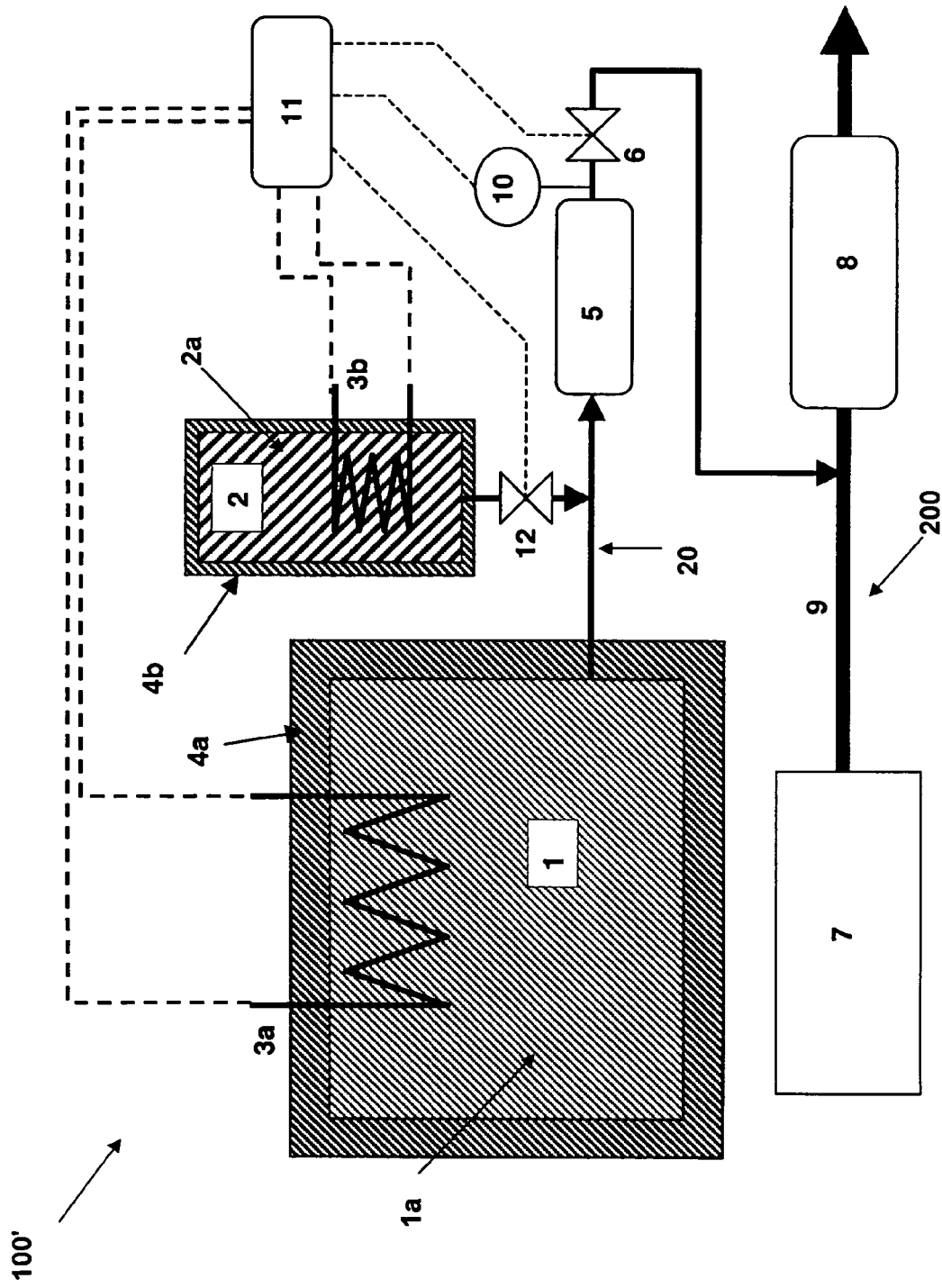
FIG. 2 shows another embodiment of an ammonia storage and delivery apparatus similar to the one of FIG. 1 and further comprising a buffer volume between the main tank and a dosing valve in an ammonia supply line leading into an exhaust line between an engine and a catalyst for selective reduction of NOx with ammonia.
Figure 3:
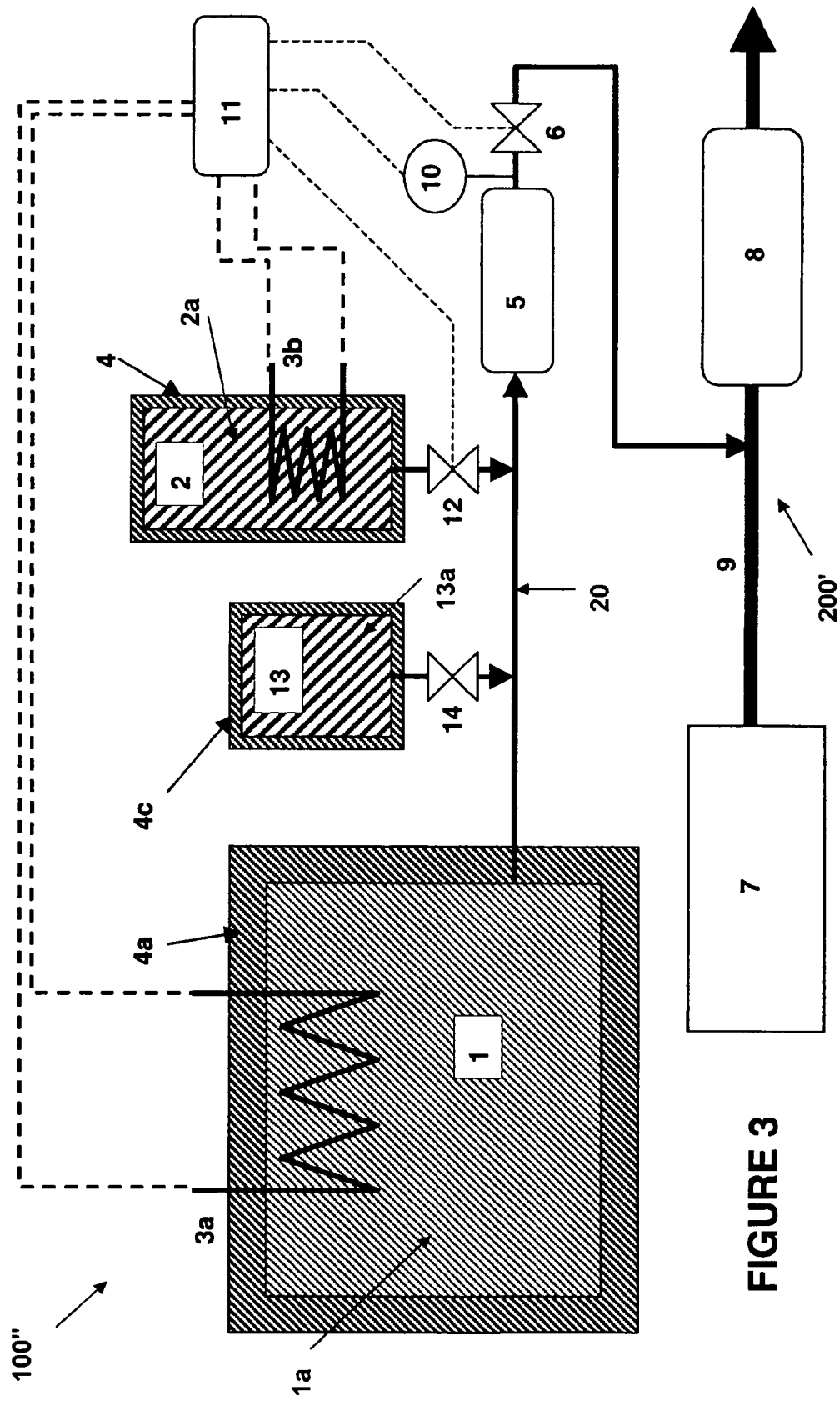
FIG. 3 shows another embodiment of an ammonia storage and delivery apparatus similar to the one of FIG. 2 and further comprising an absorbing unit containing an ammonia very strongly ad- or absorbing material.

The two materials 1a, 2a may be accommodated in one container (not shown) divided e.g. by a gate or gate valve before they are brought into fluid communication, or they may be accommodated in to different containers 1, 2 connectable in fluid communication (FIGS. 1, 2, 3).

The pressure threshold of the ammonia pressure varies with the constitution, configuration and operation requirements of the system. In an ammonia storage and delivery system/apparatus 100, 100', 100" in a mobile unit such as a motor vehicle a different pressure threshold value for bringing the system in fluid communication with the second ammonia storage material from that in a stationary unit where strong walls can define the system may be desirable. In a power plant the desired pressure threshold value may be considerably higher than in a relatively light thin walled mobile unit.

The first ammonia storage material 1a has a higher ammonia vapor pressure than the second ammonia storage material 2a. Both storage materials are ad- or absorbing and desorbing ammonia reversibly. Furthermore the second ammonia storage material 2a is only partly saturated with or void of ammonia when it is used to adsorb or absorb ammonia released from the first storage material 1a after the predetermined pressure threshold value has been reached.

The ammonia storage materials 1a, 2a adsorb or absorb ammonia reversibly. Non-limiting examples of ammonia adsorbing materials are acid-treated active carbon materials and zeolites. Non-limiting examples of ammonia absorbing materials are metal ammine complexes.

A non-limiting example, which shows the usefulness of the embodiments of the invention, is as follows. There will be a passive pressure build-up when e.g. a motor vehicle equipped with a container filled with an ammonia storage material is in a warm environment, e.g. parked in summer in the sun. When a conventional ammonia storage and delivery system is heated to e.g. 60° C., with certain ammonia storage materials wherein the ammonia is relatively volatile the ammonia pressure may reach 3 bars or more. If the system has a leak at this pressure, ammonia will be released into the environment. Also, when the ammonia storage and delivery system has been in operation, usually an active heating of the container has been applied in order to create a suitable supply pressure, e.g. 2-2.5 bar (absolute). When the vehicle is going to be parked the temperature of storage material will initially still be at the operation temperature and can release a limited quantity of ammonia even when the heating is terminated. Therefore, in a conventional system an elevated ammonia pressure will exist until the system has cooled down to room temperature (about 25° C.). If the ambient temperature is higher than room temperature, e.g. 40° C., the pressure will remain elevated. Any leak in the system will discharge ammonia into the environment which is particularly undesirable when the vehicle is parked in a garage. Therefore, in an ammonia storage and delivery system according to embodiments of the invention in a motor vehicle it may be desirable to set the predetermined pressure threshold value at about ambient pressure or about 1 bar when the system is out of operation in order to avoid a possible leakage of ammonia into the environment.

Also, when in operation the pressure in the ammonia storage and delivery system of a motor vehicle may become undesirably high, e.g. when there is a failure of the heat control. In this case, i.e. during operation of the vehicle, it may be desirable to set the predetermined pressure threshold at somewhat above the expected highest ammonia operation pressure (i.e. during the greatest possible ammonia demand of the $NO_x$ reducing catalyst), e.g. at about 5 bars, in order to avoid a possible leakage or even damage to the system.

In some embodiments the first and second ammonia storage materials 1a, 2a are contained in different containers 1, 2 or units that are connected e.g. by a pipe 20 which may comprise some type of valve 12 which is opened for bringing the two materials into fluid communication when the pressure threshold is exceeded.

The first container 1 (main storage tank) is usually surrounded by an insulation layer 4b and has heating means 3a for the volatilization of ammonia from the storage material 1a having the higher ammonia pressure. The second container 2 (storage chamber) is usually smaller than the main storage tank (1) and may optionally have heating means 3b. It may optionally be partly or fully surrounded by an insulation layer 4b, which may be a weakly insulating layer.

In some embodiments the fluid communication can be interrupted and re-established, e.g. by a suitable valve 12. The fluid communication may e.g. be interrupted when a sufficiently low ammonia vapor pressure has been reached and re-established when the ammonia vapor pressure has again reached the threshold value.

In some embodiments the first and second ammonia storage materials 1a, 2a are at the same temperature. This may, e.g., be the case when a vehicle has been parked for a while and the first and second ammonia storage materials are exposed to the same temperature.

In other embodiments the first ammonia storage material 1a is at a higher temperature than said second ammonia storage material 2a. This may, e.g., be the case, when the first ammonia material is heated to release ammonia or when the operation of the system has just ended.

In some embodiments the first ammonia material 1a is used as an ammonia source in a system having an ammonia consumption unit in operation. Such an ammonia consumption unit 200 or consumer may, without limitation, e.g. be a catalyst 8 for the selective catalytic reduction in oxygen-containing exhaust gas, as it is e.g. found in various combustion engines 7 fuelled by diesel, petrol or gasoline, natural gas, coal, hydrogen or other fossil or synthetic fuel or in other combustion processes. In some embodiments the reduction of $NO_x$ is effected in an automobile, truck, train, ship or other motorized machine, vehicle or power generator driven by a combustion engine 7.

In other embodiments the ammonia consumption unit may be a catalytic device for splitting or cracking ammonia into nitrogen and hydrogen. The hydrogen produced may, e.g., be used in a power unit for generating electricity or as fuel etc. The ammonia consumption unit may also be a fuel cell which operates directly on ammonia.

When the ammonia released is consumed by a consumption unit 200 the ammonia source, i.e. the first ammonia storage material 1a, may be heated to release the ammonia.

In some embodiments the first ammonia storage material 1a is brought into fluid communication with the second ammonia storage material 2a when the operation of the ammonia consumption unit 200 has ended and the pressure of the system is above the pressure threshold value. When the operation of the consumption unit 200 has ended the first ammonia storage material 1a may still be warm, if it has been heated for ammonia release even if the heating has been stopped. In this case the first ammonia storage material 1a will continue to release ammonia, and since there is no more consumption a pressure build-up will be the result or at least an elevated pressure for an extended period of time will be maintained and the pressure threshold value may be reached. The second ammonia storage material 2a which is only partially saturated with or void of ammonia will then be brought into fluid communication with the first ammonia storage material 1a and adsorb or absorb ammonia until the equilibrium ammonia pressure will be reached. As a result the pressure in the system 100, 100' will drop.

In some embodiments the ammonia partial pressure at 25° C. of the second ammonia storage material 2a is about or below 0.1 bar. In some embodiments the ammonia partial pressure of the first ammonia storage material 1a is in the range of about 0.1 to 1.0 bar at 25° C. In some embodiments of the invention the first ammonia storage material 1a has a higher ammonia partial pressure in its ammonia saturated state, e.g. 0.1 to 1.0 bar at 25° C., than the second ammonia storage material 2a in its saturated state at a given temperature which may e.g. have a pressure of below 0.1 bar at 25° C. In other embodiments the first and second ammonia storage materials 1a, 2a are identical materials when they are in the same ammonia saturated state. A difference in the ammonia vapor pressures is then achieved by the first ammonia storage material having a higher degree of saturation than the second ammonia storage material.

In some embodiments at least one of the first and second ammonia storage materials 1a, 2a reversibly absorbs and desorbs ammonia. In some embodiments the ammonia absorbing and desorbing material 1a, 2a is a metal ammine complex.

In some embodiments the metal ammine complex is selected from metal ammine complexes of the general formula: $M_a(NH_3)_nX_z$, wherein M is one or more cations selected from alkali metals such as Li, Na, K or Cs, alkaline earth metals such as Mg, Ca or Sr, and/or transition metals such as V, Cr, Mn, Fe, Co, Ni, Cu, or Zn or combinations thereof such as NaAl, KAl, $K_2Zn$, CsCu, or $K_2Fe$, X is one or more anions selected from fluoride, chloride, bromide, iodide, nitrate, thiocyanate, sulphate, molybdate, and phosphate ions, a is the number of cations per salt molecule, z is the number of anions per salt molecule, and n is the coordination number of 2 to 12.

In some embodiments the first ammonia absorbing and desorbing material 1a is $Sr(NH_3)_8Cl_2$ or $Ca(NH_3)_8Cl_2$ or a combination thereof. In some embodiments the second ammonia absorbing and desorbing material 2a is $Mg(NH_3)_6Cl_2$, $Fe(NH_3)_6Cl_2$ or $Ni(NH_3)_6Cl_2$ or a combination thereof.

The vapor pressures of ammonia-saturated $Mg(NH_3)_6Cl_2$, $Sr(NH_3)_8Cl_2$ and $Ca(NH_3)_8Cl_2$ are given in the table below.

|  | Ammonia pressure (bar) at | |
| --- | --- | --- |
|  | 25° C. | 60° C. |
| $Mg(NH_3)_6Cl_2$ | 0.004 | 0.02 |
| $Sr(NH_3)_8Cl_2$ | 0.52 | 3.2 |
| $Ca(NH_3)_8Cl_2$ | 0.69 | 3.9 |

The ammonia vapor pressure of $Mg(NH_3)_6Cl_2$ is much lower than that of both $Sr(NH_3)_8Cl_2$ and $Ca(NH_3)_8Cl_2$ at room temperature as well as at 60° C.

The use of $Mg(NH_3)_6Cl_2$ and materials of similar low vapor pressure as an ammonia source for an ammonia consumption unit is very safe, since they do not develop high vapor pressures when e.g. exposed to strong sunlight; however they have to be heated to a temperature of above 100° C. in order to reach an ammonia desorption pressure above 1 bar. This imposes restrictions on the material of the container, and furthermore the high operating temperature also consumes more power in order to operate the device on e.g. a car for ammonia delivery into the exhaust line for $NO_x$ reduction. A unit containing such an ammonia storage material would be operated on electrical heating and therefore an extra fuel consumption is involved when e.g. a power of say 100 W is provided by a generator that is driven by an engine having a thermal efficiency of 20-40%. As a result, any reduction in power consumption of an ammonia generating unit linked to the exhaust of an engine will have a significant influence on the overall fuel consumption of the car, truck or in another type of application.

A more volatile storage material, i.e. the storage material having a higher ammonia vapor pressure, such as $Sr(NH_3)_8Cl_2$ or $Ca(NH_3)_8Cl_2$, would result in a lower power consumption when used as a source of ammonia for an ammonia consumption unit, however its use would not be as safe e.g. in view of the undesired passive pressure build-up in the temperature range from room temperature to 100° C. The present embodiments greatly increase the safety when using materials having relatively high ammonia vapor pressures.

Figure 5:
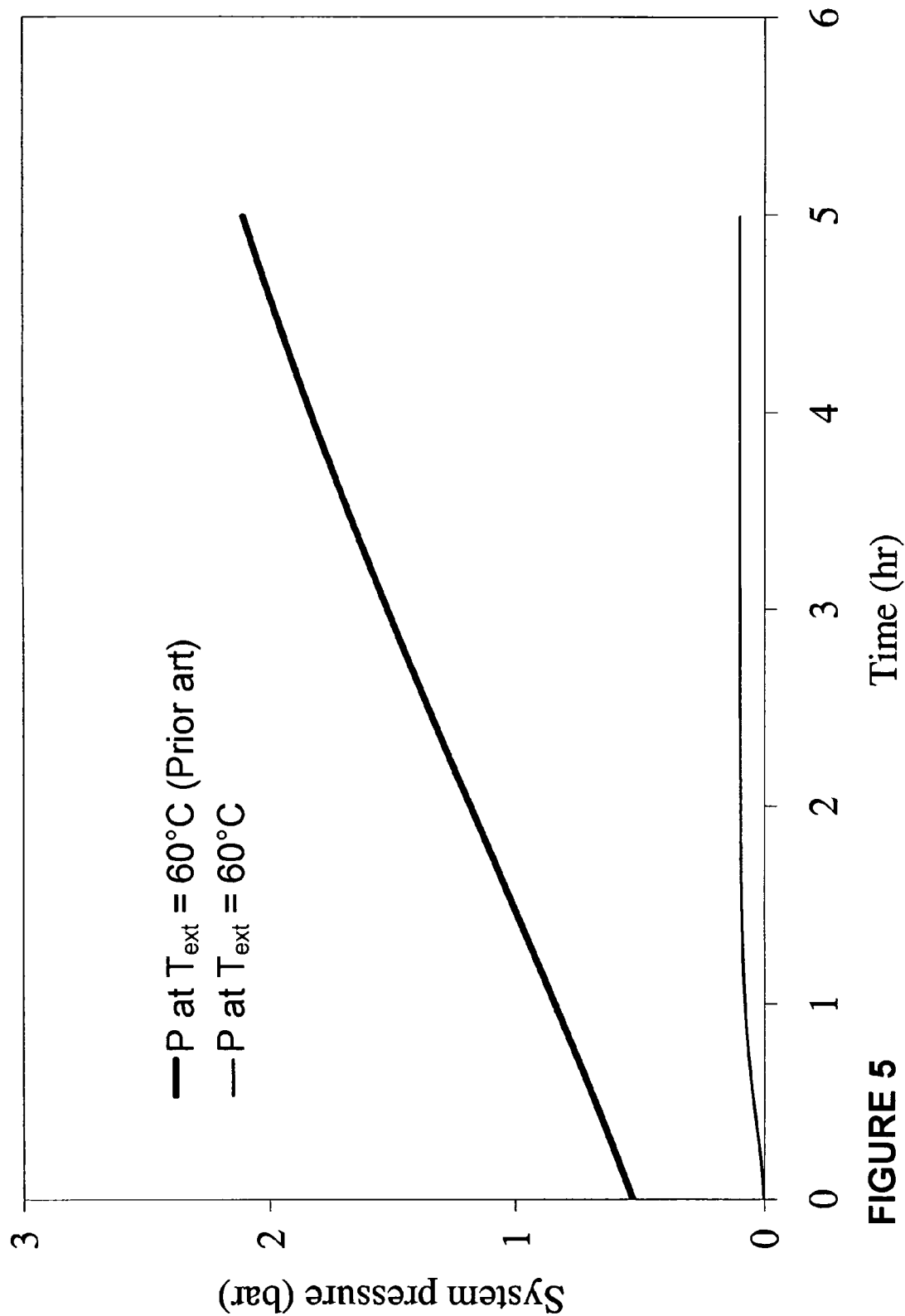
FIG. 5 shows the pressure development of an ammonia storage/delivery system according to FIG. 1 or 2 (thin line) wherein a first ammonia storage material having a higher ammonia vapor pressure and a second ammonia storage material having a lower ammonia vapor pressure, which is $MgCl_2$ void of or only partially saturated with ammonia, are used in combination. The system is initially at a temperature of 25° C. and is then exposed to a temperature of 60° C. A system according to the prior art is shown for comparison (thick line).
Figure 6:
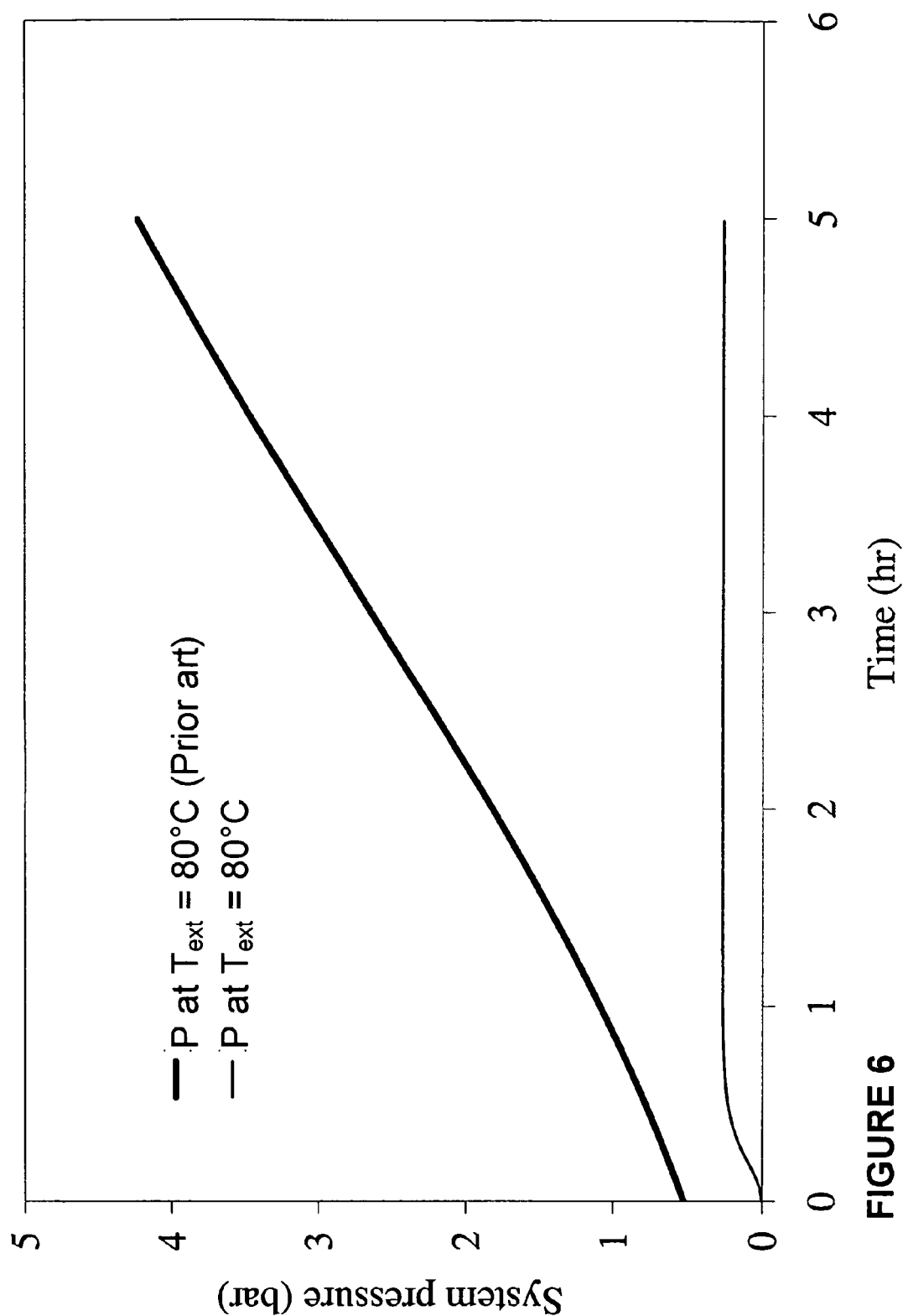
FIG. 6 shows the pressure development of the systems of FIG. 5 when exposed to a temperature of 80° C.
Figure 7:
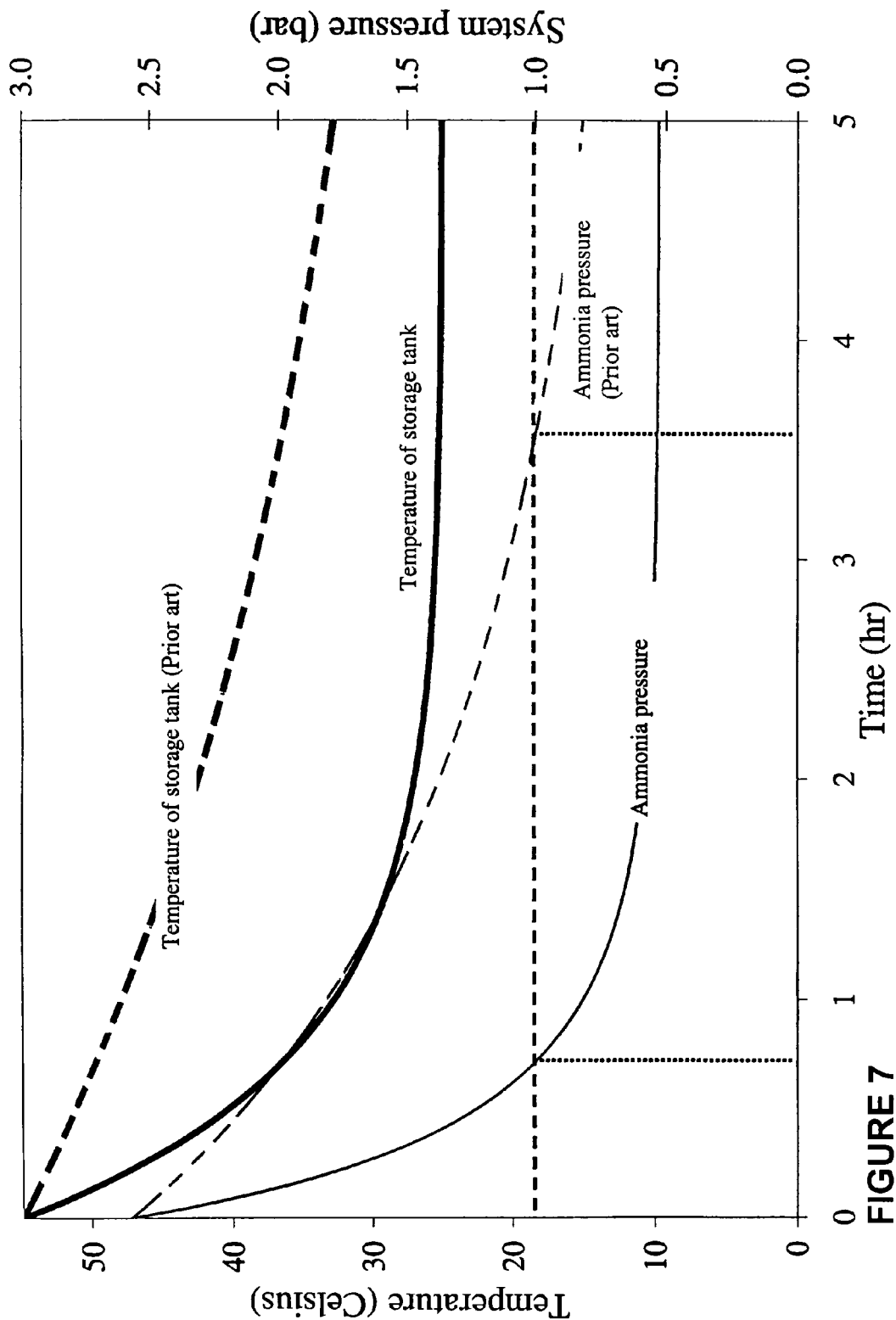
FIG. 7 shows the temperature development of a system of the prior art without a second storage material (thin dashed curved line) and of the system of FIG. 1 or 2 (thin solid line) and the pressure development of a system of the prior art without the second storage material (thick dashed line) and of the system of FIG. 1 or 2 (thick solid line) when cooling down from 55° C. and a pressure of 2.5 bar in an ambient temperature of 25° C.

Accordingly, during normal operation of an ammonia consumption unit, the above metal ammine complexes having higher vapour pressures would be used as an ammonia source. A smaller amount of an ammonia storage material having a low ammonia vapour pressure, i.e. binding ammonia much more strongly, such as $Mg(NH_3)_6Cl_2$, would in its partially or totally ammonia-depleted state (such as $MgCl_2$) be brought into fluid contact with the metal ammine complex having the higher ammonia vapor pressure, i.e. the ammonia source material, as soon as there is a safety risk, such as failure of the heat control of the container with the ammonia source material or a higher pressure than desired after stopping the ammonia consumption unit, which would e.g. be the case, when a vehicle is parked or when the car safety system detects e.g. a crash-like incident or a fire. At least a part of the excess ammonia will then be absorbed by the $MgCl_2$ or similar material, thereby lowering the pressure in the system. Accordingly, a rapid reduction in operating pressure after ending the operation of the ammonia consumption unit can be achieved, as shown in FIG. 7, and an excessive pressure build-up by passive heating when the ammonia consumption unit is exposed to a warm environment, e.g. when a car is parked in the sun, can be avoided as shown in FIGS. 5 and 6. It is clear that by embodiments of the present invention a high degree of safety an be achieved.

The absorption of ammonia by a metal salt is exothermic, i.e. associated with the generation of heat of absorption. In some embodiments, the second ammonia storage material 2a, e.g. $Mg(NH_3)_6Cl_2$ or its ammonia-depleted form $MgCl_2$ or a strongly adsorbing material such as acid-treated active carbon, therefore is in proximity to or contact with a material that can well dissipate heat to the surroundings, such as a metal and metal alloy. In this way, when the two storage units are in fluid communication the pressure of the system is governed by the temperature of the surroundings and the low ammonia pressure of the second storage material.

In some embodiments there is provided a heating means 3b for heating the second ammonia storage material 2a, e.g. by heating the second storage/deliver unit (storage chamber 2) when its saturation is higher than a threshold beyond which its absorption capacity is not sufficient to absorb ammonia to such an extend that the pressure in the system is reduced significantly. In some embodiments this can be effected during operation of the ammonia consumption unit 200, and the ammonia thus released from the second storage material 2a can be fed into the line 9 leading to the consumption unit 200, e.g. a catalyst 8 for reducing $NO_x$. Thereby it is possible to continuously keep the second ammonia storage material 2a more or less unsaturated and ready for absorbing ammonia when there is a need.

In some embodiments (not shown) more than one main storage tank 1 containing ammonia storage and delivery material 1a having a higher ammonia pressure and more than one, usually smaller storage chamber 2 containing ammonia storage and delivery material 2a having a lower ammonia vapour pressure and more than two different ammonia storage materials may be present in the apparatus 100, 100' for storing and delivering ammonia, if desired.

For example, the material in a first storage chamber 2 may be an ammonia reversibly ad- or absorbing and desorbing material and the material 13a in the second storage chamber (absorbing unit 13) may be an ammonia storage material that irreversibly and very strongly ad- or absorbs ammonia, such as active carbon treated with high amount so sulfuric acid. The second storage chamber (absorbing unit 13) may optionally be insulated 4c; this is, however, not the case, if it is an emergency unit in the case that the ammonia pressure in the system 100, 100', 100" for some reason exceeds an upper safety limit. Furthermore, the detection of an abnormal event such as a crash incident or a fire, additionally to putting into operation the first storage chamber 2, can result in rapid activation of the absorbing unit 13 and thus minimize the ammonia release in case of an accident. This is an additional safety feature of these embodiments.

All the above storage units (one or more main storage tanks 1, storage chamber 2 and absorbing unit 13) may be removably fastened to the apparatus or system 100, 100' in order to facilitate a possible exchange of the ammonia storage material.

In some embodiments there may be a buffer container 5, which is connected in fluid communication to at least one to the first storage/delivery unit (main storage tank 1) and the second storage unit (storage chamber 2). This buffer container 5 may serve for a better regulation of the pressure of the ammonia, which is delivered to the consumption unit (consumer) 200. Upstream and downstream of the buffer container 5 there may be control valves (only one (6) is shown) included in the lines to and from the same so as to control the ammonia flow into and out of the buffer container 5.

FIG. 1 shows an apparatus 100 for storing and delivering ammonia which includes a main storage tank 1 serving as a first storing/delivery unit and a storage chamber 2 serving as a second storing/delivery unit. The main storage tank 1 contains first ammonia storage material 1a having a vapour pressure (of absorbed ammonia) in the range of 0.1 to 1 bar at room temperature. The storage chamber 2 contains a second ammonia storage material 2a which binds ammonia stronger than the first storage material 1a in the main storage tank 1 (at a lower vapour pressure in the range up to 0.1 bar).

Main storage tank 1 is surrounded by an insulation layer/shell 4a and storage chamber 2 is surrounded by an insulation layer/shell 4b. These insulations/shells 4a, 4b may consist of suitable insulation materials such as mineral wool, rockwool, PUR, PIR or other insulation/shell materials suitable for the specific environmental conditions (temperature, humidity, chemical exposure) for the respective application. Such an insulation layer/shell may be filled with a porous material that is evacuated in order to further reduce the heat conductivity. The insulation layers/shells 4a, 4b may be protected by an insulation cover (not shown) or may be formed by a suitable shell material.

Main storage tank 1 and storage tank 2 comprise heating means 3a and 3b. These heating means 3a, 3b may be either formed as internal heating means embedded into the first and second storage materials 1a, 2a (see figure). They may also be arranged on the outside of the shell of the main storage tank 1 and the storage chamber 2 but on the inside of the insulation layer 4a and 4b. Suitable heating means 3a, 3b may be electrical resistance heating means or fluid heating means (hot water, steam, oil, exhaust gas, etc.), wherein the heating output is controlled by the control unit 11, either directly by controlling the electrical input (power supply) or indirectly by control valves (not shown) of the heating fluid lines (fluid supply and/or temperature).

Ammonia is supplied through a tube 20 to an ammonia consumer (not shown). The supply is controlled by the dosing valve 6, wherein the supply pressure in the apparatus 100 can be detected by a pressure sensor 10 and the control unit 11 which controls the heater 3a accordingly. The dosing valve 6 may be of any suitable type electrically, pneumatically, or hydraulically operable and controllable.

When the ammonia supply during a given ammonia demanding process has been stopped by closing the dosing valve 6, valve 12 to the storage chamber 2 is opened and the second storage material 2a in the storage chamber 2 absorbs ammonia from the main storage tank 1 and the first storage material 1a respectively due to the difference in volatility. This process keeps the pressure in the main storage 1 tank close to or below 1 bar. Valve 12 is also controlled by the controlling unit 11.

The closing of valve 6 and opening of valve 12 may also be effected by a link to the safety monitoring system of the vehicle. If e.g. a car is in a crash, the airbags will release immediately governed by an acceleration detector and this—as well as any other emergency signal from the safety monitoring system, e.g. the detection of a fire—may also trigger the closing of valve 6 and opening of valve 12.

Another system application is possible in consideration of a warm environment. The usual safe storage temperature of the main unit is for example room temperature. If the system is placed at e.g. 60° C. a slow passive heating of both the main storage tank 1 and the storage chamber 2 will occur. The increase in temperature of the main storage tank 1 also causes a rise of the ammonia pressure within the first storage material 1a. This pressure increase is detected by the pressure sensor 10; when the pressure is too high, e.g. above 1 bar, the valve 12 to the storage chamber 2 is opened and ammonia migrates from the main storage tank 1 to the storage chamber 2. The absorption of ammonia in the storage chamber 2 causes a temperature rise and the generated heat is dispersed through the insulation/shell 4b and the surface of the storage chamber 2 to the environment.

This process can be continued as long as the heat transfer into the main storage tank 1 is below the maximum heat transfer out of the storage chamber 2. In other words, the uptake of heat (energy) in the main storage tank 1 resulting in ammonia desorption must be able to be released through the insulation/shell 4b of the storage chamber 2 by heat dissipation through the insulation/shell layer 4b of the storage chamber 2.

The main storage tank 1 has an outside surface $A_1$ and the outside shell including the insulation 4a is characterised by a heat transfer factor $\alpha_1$ and the storage chamber 2 has an outside surface $A_2$ and is also characterised by heat transfer number $\alpha_2$. To allow for the above-mentioned process the following relation should hold:

$$\alpha_2 A_2 > \alpha_1 A_1. \tag{1}$$

The process can be kept up as long as the second storage material 2a is not completely saturated and is further illustrated by the example below.

The heating means 3b of the storage chamber 2 is utilised if the second storage material 2a in the storage chamber 2 is saturated. By heating, the ammonia in the storage chamber 2 can be released through the valve 12 and the valve 6 to an ammonia absorption process. The storage chamber 2 can be used during the normal ammonia release to supplement the larger unit 1 or during a fast start-up.

Thereby, it can be assured that there will always be a high capacity of ammonia absorption in the storage chamber 2 since some of the absorbed ammonia is occasionally released into a connected ammonia consuming process.

To avoid a backflow in the main storage tank 1 during release of ammonia from the storage chamber 2, a check valve (not shown) may be provided in the line 20 between the valve 12 and the main storage tank 1. Such a check valve is only necessary, if the ammonia pressure in the second storage material 2a may rise higher than the ammonia pressure in the first storage material 1a.

FIG. 2 shows an arrangement in which the apparatus according to FIG. 1 is connected to an ammonia consumer system 200, specifically to the exhaust line 9 of a combustion engine 7. The system further comprises a buffer volume 5 between the main storage tank 1 and the dosing valve 6. This buffer volume 5 may increase the ability to dose high but short peak flows and also increases the controllability of the system. The released ammonia is led from the exhaust line 9 into a catalyst 8 where selective catalytic reduction of $NO_x$ with ammonia as the reductant is carried out. The system according to FIG. 2 shows the implementation of the invention for on-board ammonia storage and delivery for automotive $NO_x$ after treatment.

FIG. 3 shows an arrangement in which the apparatus according to FIG. 2 further comprises an absorbing unit 13 having an insulation layer/shell 4c. This absorbing unit 13 is connected to the tube 20 leading form the main storage tank 1 to the buffer container 5 via a control valve 14.

The two main aspects of the inventive apparatus relate to
a) an apparatus 100, 100', 100" or a system that enables rapid reduction in operating pressure after the system has been applied during normal driving or similar ammonia dosing operation.
b) a system or apparatus that circumvents the problem with pressure built-up in the main storage tank caused by passive heating in warm environments.

In both cases the important feature is to avoid that in a car with an on-board ammonia reduction system an elevated ammonia pressure has (or will) build/t up during parking.

Figure 4:
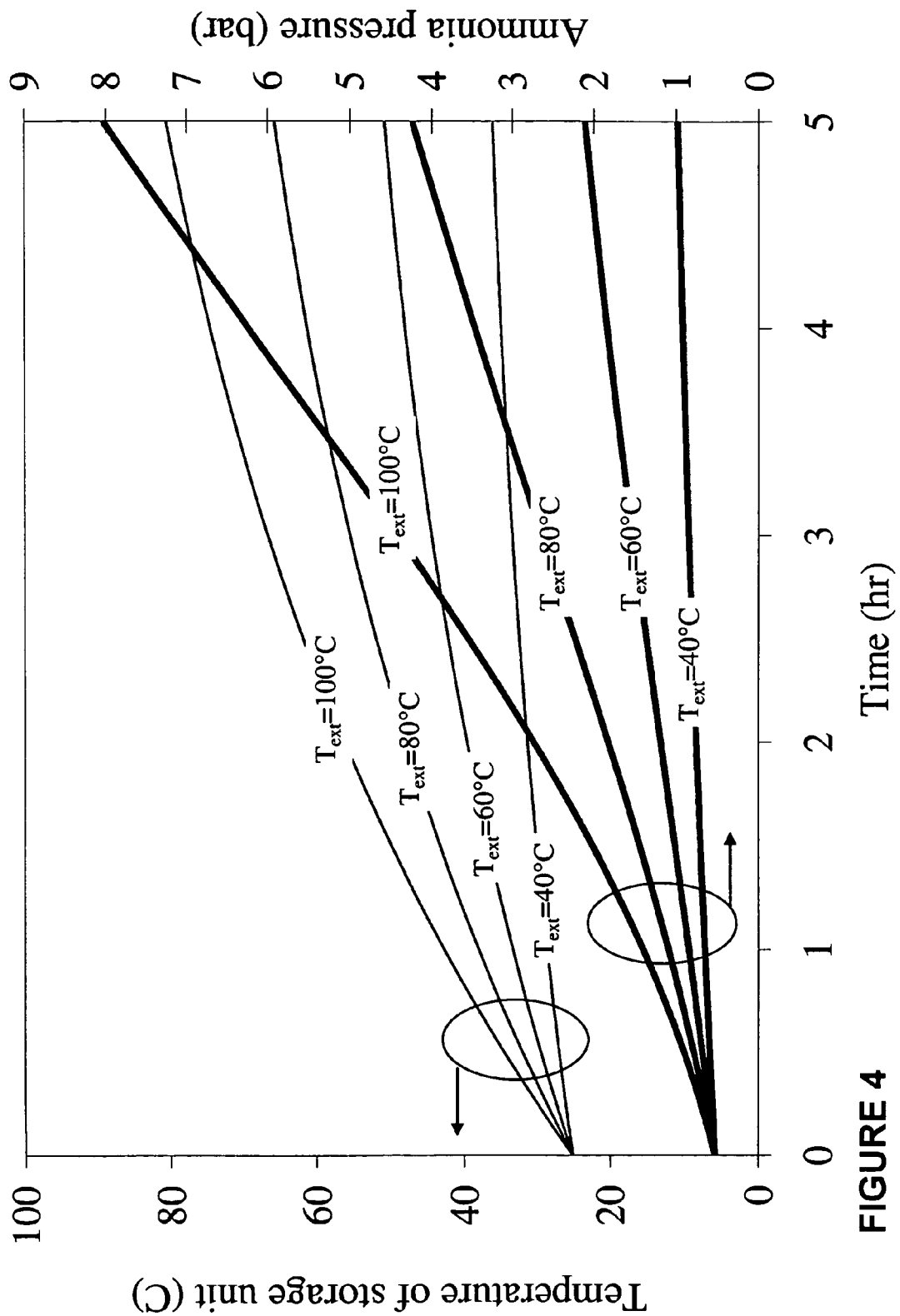
FIG. 4 shows the temperature (thin lines) and pressure (thick lines) development of an ammonia storage/delivery system according to the prior art without a second ammonia storage material wherein the ammonia storage material is initially at a temperature of 25° C. and then exposed to temperatures of 40, 60, 80 and 100° C.

FIG. 4 shows the temperature (thin-line curves) and pressure (thick-line curves) development of an ammonia storage unit according to the prior art which is thermally insulated (corresponding to approximately 7 cm rockwool) without a second ammonia storage material wherein 5 kg of the only ammonia storage material ($Ca(NH_3)_8Cl_2$) in the unit is initially at a temperature of 25° C. and then exposed to external temperatures of 40, 60, 80 and 100° C. ($T_{ext}$). Particularly in the cases of 60, 80 and 100° C. the storage unit shows a significant increase in temperature (thin-line curves); after 5 hours the temperatures are in the interval of 45 to 80° C. The associated pressure is shown in the thick-line curves. Only the unit exposed to 40° C. does not build up a pressure above 1 bar in the course of 5 hours. The storage unit that is exposed to 80° C. reaches a pressure of almost 4.5 bars after 5 hours, and the unit exposed to 100° C. reaches a pressure a as high as that of fluid ammonia at room temperature, i.e. above 8 bars. Without insulation the increase in pressure and temperature would be even more dramatic.

FIG. 5 shows the pressure (thin-line curve) development of an ammonia storage apparatus 100, 100' according to FIGS. 1 and 2 upon exposure to 60° C. (external temperature, $T_{ext}$) wherein the first storage/delivery unit (main storage tank 1) containing 5 kg of $Ca(NH_3)_8Cl_2$ which is thermally insulated (corresponding to approximately 7 cm rockwool) is in fluid communication with a smaller second storage/delivery unit (storage chamber 2; not insulated) holding 500 g of $MgCl_2$. The thick-line curve in FIG. 5 is identical to the pressure curve at 60° C. in FIG. 4, i.e. corresponds to the same prior art without a second ammonia storage material. In this case the pressure reaches more than 2 bars after 5 hours. In the system according to FIGS. 1 and 2 (thin-line curve) the ammonia pressure is lowered by the continuous absorption of ammonia by $MgCl_2$. The temperature of the latter rises slowly by the heat of absorption. Eventually a steady state is reached where the system pressure reaches 0.1 bar, ¹⁄₁₀ of atmospheric pressure.

FIG. 6 is similar to FIG. 5, except that the apparatus 100, 100' is exposed to an external temperature of 80° C. The unit according to the prior art without a second ammonia storage material (thick-line curve) reaches a pressure of almost 4.5 bars after 5 hours, whereas the pressure in the system with an apparatus 100, 100' according to FIGS. 1 and 2 (thin-line curve) stays below 0.26 bar.

FIG. 7 shows the temperature (solid and dashed thick-line curves) and pressure (solid and dashed thin-line curves) development of a unit of the prior art (dashed curves; ammonia storage material: $Ca(NH_3)_8Cl_2$) and of FIGS. 1 and 2 (solid curves; first ammonia storage material 1a: $Ca(NH_3)_8Cl_2$; second ammonia storage material 2a: $MgCl_2$) that both have an initial temperature of 55° C. and an initial ammonia pressure of 2.5 bars (a pressure which may be suitable for introducing ammonia into an exhaust line 9 of a motor vehicle slightly upstream of an $NO_x$ reducing catalyst 8) after having been in operation for 1 hour. The operation is then terminated, and the system is left in its natural environment. In the unit of the prior art, the temperature (dashed thick-line curve) and pressure (dashed thin-line curve) drop very slowly. It takes more than 3.5 hours until the system has reached a pressure below 1 bar. In the system of FIGS. 1 and 2 the pressure (solid thin-line curve) decreases to below 1 bar within a little more than half an hour due to the rapid temperature drop of the first storage/delivery unit (main storage tank 1) and thus of the whole system (solid thick-line curve). The latter is the result of the endothermic ammonia desorption from the thermally insulated main tank containing 5 kg of $Ca(NH_3)_8Cl_2$ which is driven by the exothermic absorption of ammonia into the 500 g of $MgCl_2$ contained in the smaller second storage/delivery unit (storage chamber 2) which is less or not insulated and can dissipate the heat of absorption. The data in FIG. 7 correspond to an environmental temperature of 25° C. If the temperature were 40° C., the pressure in a system of the prior art without a second ammonia storage material would at least be 1.5 bars after 5 hours. In the systems of FIGS. 1 and 2 the pressure still would have been reduced to below 1 bar within a period of 1 hour.

With the present embodiments the pressure inside an ammonia storage and delivery system will remain at a level between the ammonia pressure of the first storage/delivery unit (main storage tank 1) containing material 1a having the higher ammonia pressure and the second, usually smaller storage/delivery unit (storage chamber 2) containing material 2a having the lower ammonia pressure when the main tank 1 and the storage chamber 2 are in fluid communication. This greatly contributes to the safety of an ammonia storage and delivery system, which uses a solid ammonia ad- or absorbing and desorbing material having a relatively high ammonia pressure as an ammonia source.

The present method and system may be used in all mobile or portable systems comprising a catalyst for the selectively catalytic reduction of $NO_x$, in fuel cells or in systems comprising a catalyst for splitting ammonia into nitrogen and hydrogen or in combination with other ammonia-consuming processes where the safe use of volatile ammonia ad- or absorbing and desorbing materials is required.

Example

A first storage/delivery unit or main storage tank 1 contains 10 kg of $Sr(NH_3)_8Cl_2$. A smaller second storage/delivery unit or storage chamber 2 initially contains 500 g $MgCl_2$.

A normal passenger car with a modern engine requires about 0.2-0.4 g $NO_x$ to be removed per kilometer driven. It is assumed that a mass of 0.3 g $NO_x$ corresponds to 0.3 g/km*17/30=0.17 g $NH_3$/km consumed for reduction of $NO_x$. Given those specifications, the system defined as above gives:

[10,000 $gSr(NH_3)_8Cl_2$]*[0.462 $gNH_3/gSr(NH_3)_8Cl_2$]/ [0.17 $gNH_3$/km]=27,200 km of driving range based on the main storage tank.

The $MgCl_2$ in the smaller storage chamber 2 can absorb 0.517*500 g/(1−0.517)=535 g $NH_3$ (the mass fraction of ammonia in the fully saturated $Mg(NH_3)_6Cl_2$ is 0.517). Given a density of approximately 1.2 g/cm³, the volume of the main 10 kg unit is approximately 8 liters. The main storage tank 1, an 8-liter tank, has an external area $A_1$ of approximately 0.3 m². The heat transfer coefficient $\alpha_1$ of the insulated tank is assumed to be 0.2 W/K/m², and when the temperature difference between container and surroundings is 85-25 Celsius=60 Celsius (or K) the warming of the main storage tank is thus:

$P_{heat}$=0.3 m²*0.2 W/K/m²*(60K)=12 W.

wherein $P_{heat}$ is the rate of heat (energy) transfer into the 8-liter unit per unit time (J/s=W).

Assuming all heat transfer results in ammonia desorption, the corresponding ammonia desorption rate is found as 12 W divided by the molar ammonia desorption enthalpy (the enthalpy is approximately 42 kJ/mole $NH_3$ for $Sr(NH_3)_8Cl_2$). That gives an ammonia release rate of roughly $2.9*10^{-4}$ mol/sec or $4.9*10^{-3}$ g $NH_3$/sec.

Since the $MgCl_2$ unit 2 has a capacity of absorbing 535 g $NH_3$, the system exemplified here can continuously be parked in an environment of 85° C. for 30.3 hours without the pressure being raised significantly.

The case presented here can be considered as the heat transfer needed both for raising the average temperature of the 8-liter unit as well as providing energy for ammonia release. There will be a lag-phase, where the 12 W of heating will only result in an elevation of the average temperature of the 8-liter unit whereas the ammonia release will use a greater fraction of the 12 W when the average temperature has raised e.g. from 25 to 45° C.

In addition, the 12 W of heat transfer rate may be reduced over time as the external surface of the tank may increase in temperature and thus reduce the gradient between the surroundings and the surface of the storage tank.

All patents, patent applications and journal articles cited in this application are herein incorporated by reference in their entirety.

The invention claimed is:

1. A system for storing and delivering ammonia, comprising:
   first and second storing/delivery units connectable in fluid communication, said first and second storing/delivery units comprising heating means and
   containing first and second solid ammonia storage materials capable of reversibly ad- or absorbing and desorbing ammonia,
   wherein the first ammonia storage material in the first storing/delivery unit has a higher vapour pressure than the second ammonia storage material in the second storing/delivery unit.

2. The system according to claim 1, wherein the first storing/delivery unit has a first shell with a surface area $A_1$ and a heat-transfer coefficient $\alpha_1$ and the second storing/delivery unit has a second shell with a surface area $A_2$ and a second heat-transfer coefficient $\alpha_2$, and wherein the following relation applies: $\alpha_2 A_2 > \alpha_1 A_1$.

3. The system according to claim 1, further comprising a buffer container being connectable in fluid communication to at least one of the first and second storing/delivery units.

4. The system according to claim 1, further comprising an absorbing unit being connectable in fluid communication to at least one of the first and second storing/delivery units wherein the absorbing unit either contains a reversibly ad- or absorbing and desorbing ammonia storage material or an irreversibly ad- or absorbing ammonia storage material.

5. The system according to claim 1, comprising a control valve arrangement for connecting at least the first storing/delivery unit with an ammonia consumer.

6. The system according to claim 5 wherein the ammonia consumer is selected from a catalyst for SCR of $NO_x$ in oxygen-containing exhaust gas, a catalytic device for splitting ammonia into nitrogen and oxygen and a fuel cell.

7. The system according claim 6 wherein SCR of $NO_x$ in the oxygen-containing exhaust gas is effected in an automobile, truck, train, ship or other motorized machine, vehicle or engine-driven generator.

8. Automotive $NO_x$ treatment device comprising a system according to claim 1.

* * * * *